3,049,529
Patented Aug. 14, 1962

3,049,529
PROCESS FOR PRODUCTION OF OLEFIN POLYMERS
John E. Wicklatz and Charles W. Moberly, Bartlesville, Okla., assignors to Phillips Petroleum Company, a corporation of Delaware
No Drawing. Filed Nov. 12, 1957, Ser. No. 695,510
9 Claims. (Cl. 260—94.9)

This invention relates to the polymerization of olefins. In one aspect, the invention relates to an improved method for polymerizing olefins.

Reactions for polymerizing olefins are well known in the art and are generally carried out in the presence of catalysts. One class of catalysts which have been used in the polymerization of monoolefins, particularly ethylene, is organometal compounds, for example, triethylaluminum, and the polymers which have been obtained in accordance with this method are generally liquid or low molecular weight solid polymers. Frequently, the polymers obtained are dimers or trimers of the olefin charged. However, it is often desirable to produce higher molecular weight polymers which have desirable properties of heat stability and can be molded into vessels, pipes and tubing. Such uses cannot be made of the lower molecular weight polymers, for example, a polymer having a molecular weight of about 1000, since a polymer of this molecular weight is a wax-like material.

It is an object of this invention to provide an improved process for polymerizing olefins.

Another object of the invention is to provide a method for treating certain catalyst systems so as to render them capable of producing polymer in high yields.

Other and further objects and advantages of the invention will become apparent to those skilled in the art upon consideration of the accompanying disclosure.

The present invention resides in the discovery that olefin polymers can be prepared in increased yields by an organometal halide-group IV metal alcoholate catalyzed polymerization by aging the catalyst at a temperature above atmospheric temperatures for a definite period of time prior to contacting the catalyst with the olefin to be polymerized. In one embodiment, in a process for polymerizing olefins in the presence of a catalyst comprising a mixture of an organometallic halide and an alcoholate of a group IV metal, the improvement of this invention comprises initially contacting the aforementioned catalyst components at a temperature in the range of 100 to 150° F. for a period of time in the range of 15 to 60 minutes and thereafter contacting the catalyst components with the olefin to be polymerized at a temperature in the range of 140 to 250° F. It has been found that a catalyst which has been treated or aged in the manner described produces polymer in much greater yields than a catalyst which has not been subjected to the treatment.

The organometal halides used in the catalyst system of this invention correspond to the formula $R_xMX_y$, wherein R is a saturated acyclic hydrocarbon radical, a saturated cyclic hydrocarbon radical, an aromatic hydrocarbon radical, or mixtures of these radicals, wherein M is a metal selected from the group consisting of aluminum, gallium, indium, and thallium, and wherein X is a halogen. The $x$ and $y$ are integers, and the sum of $x$ and $y$ is equal to the valence of the metal M. X can be any of the halogens, including chlorine, bromine, iodine and fluorine. The saturated acyclic hydrocarbon radicals, the saturated cyclic hydrocarbon radicals, and the aromatic hydrocarbon radicals which can be substituted for R in the formula include hydrocarbon radicals having up to about 20 carbon atoms each. Radicals having 10 carbon atoms or less, are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of organometal halides which are useful in the catalyst composition of this invention are the following: $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $C_6H_5GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $C_6H_{11}InBr_2$ (cyclohexane derivative), $C_{17}H_{35}TlI_2$, $(CH_3)_2TlBr$, and the like.

The alcoholates of a metal of group IV of the periodic system which can be employed conform to the formula $M'(OR')_n$, wherein M' is a metal selected from the group consisting of titanium, zirconium, hafnium, and thorium, wherein R' is selected from the group consisting of saturated acyclic (alkyl) monoolefinic acyclic (alkenyl) saturated cyclic (cycloalkyl), monoolefinic cyclic (cycloalkenyl), aromatic (aryl), and combinations of two or more of these radicals. Examples of, but not exhaustive of, such combinations are alkaryl, aralkyl, alkarylalkyl, alkylcycloalkyl, alkylalkenyl, cycloalkylalkenyl, cycloalkylalkyl, alkenylaryl, and alkenylcycloalkyl. The $n$ in the formula is equal to the valence of the metal M'. Each R contains not more than 20 carbon atoms, preferably less than 10 carbon atoms, with the total number of carbon atoms in the compound not exceeding 50. Although numerous compounds fall within the scope of the class of complex materials corresponding to the formula $M'(OR')_n$, the preferred ones include titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra-m-tolyl titanate, tetraallyl titanate, tetracyclohexenyl titanate, tetracyclopentyl titanate, tetraethyl zirconate, tetramethyl zirconate, tetrabutyl zirconate, tetraisopropyl zirconate, tetraamyl zirconate, tetrabenzyl titanate, tetra-2-(3-ethylphenyl)ethyl titanate, tetra-3-methylcyclohexyl zirconate, tetra-1-cyclopentylallyl titanate, tetra-4-cyclohexylbutyl zirconate, tetra-p, allylyphenyl titanate, tetra-3-propenylcyclohexyl zirconate, and the like. Also included are such compounds as $Hf(OCH_3)_4$, $Th(OC_3H_7)_4$, $$Th(OC_6H_5)_4, Zr(OC_4H_7)_4, Th(OC_6H_{13})_4,$$

and $Zr(OC_{12}H_{25})_4$.

Of the complex compounds listed in the above group, titanium butoxide ($Ti(OC_4H_9)_4$) is preferred for use in our catalyst system since the use of this material as a catalyst in the polymerization of ethylene provides a high molecular weight, extremely flexible and tough polymer which can be molded into a variety of shapes and forms.

The treating or aging step to which the catalyst components of this invention are subjected prior to use in the polymerization is carried out at a temperature in the range of 100 to 150° F. for a period of time in the range of 15 to 60 minutes. The higher the temperature employed in the aging step, the shorter the period of time necessary to provide the improved catalyst of this invention. The treating step is also carried out at a temperature below that which is utilized in the polymerization, preferably at a temperature at least 30° F. below the polymerization temperature. The polymerization stage of the process of this invention is usually carried out at a temperature in the range of 140 to 250° F. Accordingly, when a catalyst treating temperature of 150° F. is utilized, the temperature of the polymerization is then above the minimum temperature specified in the aforementioned polymerization temperature range. It has been found that excellent results can be obtained by carrying out the treating step at 125° F. for a period of 30 minutes, followed by polymerization at a temperature of 175° F.

The aging or treating step of the process of this invention is preferably carried out in the presence of a diluent similar to that which is to be subsequently utilized in the polymerization. However, the treatment of the catalyst can be conducted without the use of a diluent. The catalyst is also treated or aged under an atmosphere of a fluid which will not deactivate the catalyst complex but will prevent deactivating materials, e.g., oxygen, carbon dioxide or moisture, from coming into contact therewith. The pressure under which the treatment is carried out need only be sufficient to exclude catalyst deactivating materials. Usually this pressure is slightly greater than normal atmospheric pressure. When the aging of the catalyst is accomplished under an atmosphere of an inert gas, such as nitrogen, any desired superatmospheric pressure can be used, the only limitation being imposed by the equipment employed. It is preferred to carry out the aging or treating step under an atmosphere of the monomer to be polymerized in which case a pressure is employed which at the aging temperature results in the formation of substantially no polymer. For example, when aging the catalyst components at a temperature of 100° F. under an atmosphere of the monomer to be polymerized, a pressure of about 300 p.s.i. can be used. However, at an aging temperature of 150° F., a pressure below about 100 p.s.i. is employed. In general, it is usually preferred to operate at a pressure below 100 p.s.i., e.g., between atmospheric and 100 p.s.i. when either an inert gas or a monomer is used as the blanketing atmosphere.

As previously mentioned, the polymerization stage of the process of this invention is carried out at a temperature between 140 and 250° F. The pressure utilized in the polymerization is generally in excess of 100 p.s.i.g., preferably in excess of 250 p.s.i.g. It has been found that the yield of polymer from the polymerization increases as the pressure employed increases. The upper limit on the pressure to be used is, in general, governed by the equipment available and operating limitations. It is usually preferred to operate at a pressure in the range of 100 to 1000 p.s.i.g., more desirably between 250 and 1000 p.s.i.g., although higher pressures can be employed.

The ratio of the amounts of organometal halide to the group IV metal alcoholate will usually be in the range of 2.5 to 1 to 7.0 to 1 on a weight basis, preferably within the range of 3 to 1 to 5 to 1. The amount of the catalyst composition of this invention which is used in the polymerization of olefins is usually within the range of 0.5 to 2.5 weight percent, based on the monomer charged to the reactor, preferably between 0.65 to 1 weight percent.

The materials which are polymerized in accordance with this invention are olefinic hydrocarbons, preferably those containing from 1 to 8 carbon atoms per molecule. A preferred group of olefinic hydrocarbons are the normal 1-olefins, the preferred material from this group being ethylene. Examples of other aliphatic 1-olefins which can be used in the process of this invention are propylene, 1-butene, 1-hexene, and 1-octene. Branched chain olefins can also be used, such as isobutylene. Also, 1,1-dialkyl-substituted and 1,2-dialkyl-substituted ethylenes can also be used, such as butene-2, pentene-2, hexene-2, heptene-3, 2-methyl-butene-1, 2-methyl-hexene-1, 2-ethyl-heptene-1, and the like. Examples of the di- and polyolefins in which the bonds are in the non-conjugated positions and which can be used in accordance with this invention are 1,5-hexadiene, 1,4-pentadiene, and 1,4,7-octatriene. Cyclic olefins can also be used, such as cyclohexene. Mixtures of the foregoing polymerizable hydrocarbons can be polymerized to a solid polymer in the presence of the catalyst system of this invention as, for example, by copolymerizing ethylene and propylene, ethylene, and 1-butene, propylene and 1-butene, or propylene and a pentene. Furthermore, aryl olefins, e.g., styrene and alkyl-substituted styrenes can be polymerized to a solid polymer in the process of this invention. The invention is also applicable to the polymerization of a monomeric material comprising conjugated dienes containing up to and including 8 or more carbon atoms per molecule. Examples of conjugated dienes which can be used include 1,3-butadiene, isoprene, 2,3-dimethylbutadiene, 2-methoxybutadiene, 2-phenylbutadiene and the like. It is within the scope of the invention to polymerize such conjugated dienes either alone or in admixture with each other and/or with one or more other compounds containing an active $CH_2=C<$ group which are copolymerizable therewith. Examples of such compounds are listed above. Examples of other compounds containing an active $CH_2=C<$ group include styrene, acrylonitrile, methyl acrylate, methyl methacrylate, vinyl chloride, 2-methyl-5-vinylpyridine, 2-vinylpyridine, etc.

Suitable solvents or diluents for use in the aging or treating step as well as in the polymerization stage of this process are paraffins, halogenated paraffins, cycloparaffins and/or aromatic hydrocarbons, which are relatively inert, non-deleterious and liquid under the conditions of the process. While the process is preferably carried out in the presence of the diluent, it can be conducted without the use of a diluent. Examples of diluents which can be used include butane, pentane, isooctane, cyclohexane, methylcyclohexane, and carbon tetrachloride. Benzene, toluene, and the halogenated aromatics, such as chlorobenzene, can also be employed. It is also within the scope of the invention to utilize mixtures of two or more of the aforementioned diluents.

The process of this invention can be carried out as a batch process by pressuring the olefin into a reactor containing the treated catalyst and a diluent. Furthermore, the process can be carried out continuously by maintaining the above-described concentrations of reactants in the reactor for a suitable residence time. The residence time used in a continuous process can vary widely since it depends to a great extent upon the temperature at which the process is carried out. The residence time also varies with the specific olefin that is to be polymerized. However, the residence time for the polymerization of aliphatic monoolefins generally falls within the range of one second to an hour or more. In the batch process, the time for the reaction can also vary widely, such as up to 24 hours or more.

It has been found that various materials in some instances may have a tendency to inactivate the catalyst composition of this invention. These materials include carbon dioxide, oxygen and water. Therefore, it is usually desirable to free the monomers from these materials, as well as from other materials which tend to inactivate the catalyst, before contacting with the treated catalyst occurs. Any of the known means for removing such contaminants can be employed. The diluent used in the process should also be free of contaminants, such as water, oxygen, and the like. It is desirable also that air and moisture be removed from the reaction vessel before the reaction is carried out. However, in some cases small amounts of catalyst inactivating materials, such as oxygen or water, can be tolerated in the reaction mixture while still obtaining reasonably good polymerization rates. It is to be understood that the amount of such material present in the reaction mixture shall not be sufficient to completely inactivate the catalyst.

At the completion of the polymerization reaction, any excess olefin is vented, and the contents of the reactor, including the solid polymer swollen with diluent, are then treated to inactivate the catalyst and remove the catalyst residues. The inactivation of the catalyst can be accomplished by washing with an alcohol, water or other suitable material. In some instances the catalyst inactivating treatment also removes a major portion of the catalyst residues while in other cases it may be necessary to treat the polymer with an acid, base or other suitable material in order to effect the desired removal of catalyst residues. The treatment of the polymer can be carried out in a comminution zone, such as a Waring Blendor, so that a finely divided polymer is thereby provided. The polymer is then separated from the diluent and treating agents, e.g., by decantation or filtration after which the polymer is dried. The diluent and alcohol can be separated by any suitable means, e.g., by fractional distillation, and reused in the process.

A more comprehensive understanding of the invention may be obtained by referring to the following illustrative example which is not intended, however, to be unduly limitative of the invention.

EXAMPLE

A number of runs were made in which ethylene was polymerized to high molecular weight polyethylene in the presence of a catalyst system consisting of ethylaluminum sesquichloride and tetrabutyl titanate.

The monomer used in these runs was a commercial grade ethylene of 99.5 percent purity. This ethylene, prior to polymerization, was passed through pyrogallol to remove oxygen and carbon dioxide, after which the ethylene was dried over a mixture of silica gel and alumina which had been activated at 800° F. The ethylaluminum sesquichloride, essentially an equimolar mixture of diethylaluminum monochloride and ethylaluminum dichloride, was prepared according to the following procedure.

A 3-liter, round bottom flask, fitted with a stirrer, thermocouple well, a nitrogen inlet tube, an ethylchloride induction tube, and a condenser (reflux), was charged with 250 cc. of cetane, 225 grams of aluminum powder, and a trace of iodine (catalyst). The system was then flushed with prepurified nitrogen, after which a nitrogen atmosphere was maintained over the reaction mass. The suspension of aluminum in cetane was heated to 150° C., and ethyl chloride was added while stirring vigorously. The temperature was maintained between 150 and 180° C. during consumption of ethyl chloride, which ceased after about 8 hours. After cooling the mixture to room temperature, an additional 225 grams of aluminum powder was added. The temperature was then raised to 110° C., and ethyl chloride addition was continued as before. The total time for addition of the ethyl chloride was 12 to 16 hours. The product was recovered from the reaction mixture by distilling in an atmosphere of prepurified nitrogen. Two fractions, boiling at 78 to 80° C. and 80 to 86° C. were collected, and these fractions had the following composition:

| Boiling Range | Grams | Weight percent Chlorine |
|---|---|---|
| 78–80 | 1,213 | 49.4 |
| 80–86 | 301 | 45.5 |

The fraction containing 49.4 weight percent chlorine was used in preparing the catalyst.

The tetrabutyl titanate employed in these runs was a commercial grade material (Du Pont), and was a viscous liquid of 0.95 specific gravity. The cyclohexane (diluent) utilized in these runs had been sulfuric acid-treated to reduce the sulfur content to 10 to 20 p.p.m. The ethylaluminum sesquichloride, prepared as described above, was dissolved in cyclohexane to form a solution which contained 0.24 gram of the sesquichloride per millimeter of solution.

In these runs, a one-gallon, jacketed, type 316 stainless steel reactor was used, this vessel being fitted with a propeller type agitator and an internal cooling coil. Cooling water was circulated through the cooling coil during the polymerization to control the temperature while necessary heat was supplied by circulating electrically heated decalin through the jacket.

When carrying out these polymerization runs, two different procedures were employed for the charging of the catalyst to the reactor. In the first method, a portion of the cyclohexane (diluent) which was to be used in a given run was charged to a calibrated measuring tube. The tube was then flushed with nitrogen, and the desired amount of the above-described ethylaluminum sesquichloride solution was pressured into the tube by means of nitrogen. The tube was then stoppered and shaken, and the contents were poured into a 3-necked flask which contained 500 milliliters of purified cyclohexane and which had been previously flushed with nitrogen. The flask was continuously purged with nitrogen while charging the sesquichloride. The desired amount of tetrabutyl titanate was then pipetted into the flask, and the pipet was rinsed with cyclohexane to ensure the charging of all of the tetrabutyl titanate. The flask was then swirled to mix the components. The flask contents were then poured into a stainless steel charge vessel from which material was pressured into the reactor.

In the other method, the desired amount of ethylaluminum sesquichloride solution was pressured directly into a calibrated tube through which cyclohexane was passed to rinse the catalyst into the reactor. In this method, the tetrabutyl titanate was added directly to the reactor by means of a hypodermic syringe installed in a reactor fitting through which purge nitrogen was passing. In all of the runs, utilizing either charging procedure, a total of 2000 cc. of diluent (cyclohexane) was employed.

After the addition of the catalyst to the reactor, the reactor was purged three times by pressuring to 200 p.s.i.g. with ethylene. At this point, if aging of the catalyst was not employed, the reactor temperature was raised to the desired level, and ethylene was pressured into the reactor from a one-pound cylinder which was mounted on a torsion balance so that the weight of ethylene charged could be determined. Ethylene was charged until the desired reactor pressure was reached, and additional ethylene was added during the course of the run as ethylene was consumed by polymerization.

At the termination of the run, the reactor was cooled by circulating cooling water through the coil and by circulating the decalin in the jacket through a cooler. The ethylene remaining after cooling was bled off through a vent, and the reactor was flushed with nitrogen prior to removing the reactor cover to recover the polymer. The polymer was then placed in an approximately equal volume of methanol, chopped in a one-gallon Waring Blendor, filtered with suction and dried for about 16 hours in a vacuum oven at 160° F.

In the first series of runs, the results of which are shown below in Table I, the effect of polymerization temperature upon polymer yield was studied. Since the catalyst complex was not aged in runs 1 to 5, they are to be regarded as control runs for this invention. In these runs, and in all runs given hereinafter, ethylaluminum sesquichloride is referred to as EASC, and tetrabutyl titanate is referred to as TBT. All of the runs of Table I were carried out at 300 p.s.i.g. for 5 hours, and the amounts of EASC and TBT were 3.4 grams and 1.0 gram, respectively. Only the polymerization temperature was varied for the different runs.

*Table I*

| Run No. | Polymerization Temp., ° F. | Yield of Polymer, Grams |
|---|---|---|
| 1 | 100 | 0 |
| 2 | 125 | 33 |
| 3 | 150 | 152 |
| 4 | 175 | 155 |
| 5 | 200 | 145 |

In a second series of runs, it was found that aging of the catalyst complex at an elevated temperature resulted in an increased yield of polymer. These runs were all carried out at 175° F., the optimum temperature as shown in Table I, and 300 p.s.i.g., using 3.4 grams of EASC and 1.0 gram of TBT. The results of these runs are shown hereinbelow in Table II. Run 4 from Table I is included in Table II in order to show the ethylene yield when the catalyst is not aged.

Table II

| Run No. | Time, hrs. | Aging Procedure | Yield, gms. |
|---|---|---|---|
| 4 | 5 | Unaged | 155 |
| 6 | 4 | Aged 30 min. @ 125° F. under 50 p.s.i.g. ethylene pressure. | 339 |
| 7 | 4 | Aged 30 min. @ 125° F. under 40 p.s.i.g. nitrogen pressure. | 221 |

In a still further series of runs, the catalyst complex was aged for 30 minutes at 125° F. under 40 p.s.i.g. ethylene pressure, followed by polymerization at 175° F. and 300 p.s.i.g. ethylene pressure for 4 hours. In these runs, the results of which are shown below in Table III, the weight ratio of EASC to TBT was varied to determine the optimum ratio.

Table III

| Run Number | 8 | 9 | 10 | 11 | 12 |
|---|---|---|---|---|---|
| EASC, grams | 3.4 | 3.4 | 3.4 | 3.4 | 3.4 |
| TBT, grams | 0.5 | 0.75 | 1.0 | 1.7 | 3.4 |
| EASC/TBT, weight ratio | 6.8/1 | 4.5/1 | 3.4/1 | 2/1 | 1/1 |
| Yield of Polymer, grams | 77 | 112 | 134 | 21 | 5 |
| Productivity, gms. Polymer/gm. Catalyst | 19.7 | 26.4 | 30.4 | 4.1 | 0.7 |

The data from runs 8 to 12 indicate that the optimum ratio of EASC to TBT is around 3.4 to 1.

In yet another series of runs, the effect of pressure on the yield of polymer was determined. These runs were carried out by aging the catalyst complex, consisting of 3.4 grams of EASC and 1 gram of TBT, for 30 minutes at 125° F. under 40 p.s.i.g. ethylene pressure, followed by polymerization at 175° F. for four hours. The results of these runs are set forth below in Table IV.

Table IV

| Run Number | 13 | 14 | 15 |
|---|---|---|---|
| Polymerization Pressure, p.s.i.g | 150 | 300 | 450 |
| Polymer Yield, grams | 110 | 493 | 730 |

Another set of runs was made, in which the total catalyst level was varied. These runs were carried out by using a 3.4/1 weight ratio of EASC/TBT, aging for 30 minutes at 125° F. under 40 p.s.i.g. ethylene pressure, and polymerizing for four hours at 175° F. and 300 p.s.i.g. ethylene pressure. The results of these runs are given below as Table V.

Table V

| Run Number | 16 | 17 | 18 | 14 [1] | 19 | 20 |
|---|---|---|---|---|---|---|
| EASC, grams | 1.7 | 2.1 | 2.5 | 3.4 | 5.1 | 6.8 |
| TBT, grams | 0.5 | 0.625 | 0.75 | 1.0 | 1.5 | 2.0 |
| Total Catalyst, grams | 2.2 | 2.725 | 3.25 | 4.4 | 6.6 | 8.8 |
| Ethylene Feed, grams | not meas. | 451 | 470 | 559 | not meas. | 277 |
| Wt. percent Catalyst (based on ethylene) | not calc. | 0.605 | 0.692 | 0.788 | not calc. | 3.18 |
| Yield Polymer, grams | 52 | 222 | 286 | 493 | 360 | 200 |
| Productivity, gms. Polymer/gm. Catalyst | 24 | 81 | 88 | 110 | 55 | 22.8 |

[1] Also given in Table IV.

A run was made at the optimum conditions as determined by the above runs. This run, namely run 21, was carried out using 3.4 grams of EASC and 1 gram of TBT, utilizing a catalyst aging step of 30 minutes at 125° F. under 40 p.s.i.g. ethylene pressure. The polymerization stage was carried out for 4 hours at 175° F. and 300 p.s.i.g. ethylene pressure. The yield of polymer from this run was 484 grams. The polymer from this run was analyzed, and its properties and characteristics were determined. The results of these analyses are set forth below in Table VII.

Table VII

| | |
|---|---|
| Density, g./cc. at room temperature | 0.958 |
| Melt index [1] | 0.089 |
| Crystalline freeze point [2] | 253±2 |
| Molecular weight [3] | 60,600 |
| Stiffness, p.s.i. [4] | 121,000 |
| Flex temperature, °F. [5] | +68 |
| Hardness, Shore D [6] | 70 |
| Heat distortion temperature, °F. [7] | 140 |
| Softening temperature, °F | 263 |
| Tensile strength, 20″/min. pull: | |
| Compression molded @ 325° F., p.s.i. [8] | 4432 |
| Injection molded @ 400° F., p.s.i. [9] | 7162 |
| Elongation, 20″/min. pull: | |
| Compression molded @ 325° F., percent [8] | 24 |
| Injection molded @ 400° F., percent [9] | 8 |
| Structural properties: | |
| By X-ray and nuclear resonance— | |
| Crystallinity | 90 |
| By infrared analysis— | |
| Methyl groups/1000 carbon atoms | 1 |
| Approximate carbon atoms/double bond | 1100 |
| Unsaturation distribution— | |
| Vinyl | 93 |
| Trans | 6 |
| Branched vinyl | 1 |

[1] ASTM D1238–52T.
[2] Determined by melting the polymer and then cooling it slowly, the crystalline freeze point being recorded as the first plateau in time v. temperature curve.
[3] Determined from melt index.
[4] ASTM D747–50.
[5] Determined by method of Clash and Berg, Ind. & Eng. Chem., 34, 1218 (1942); recorded as temperature at which modulus in torsion is 135,000 p.s.i.
[6] ASTM D676–55T.
[7] ASTM D648–45T.
[8] ASTM D412–51T.
[9] ASTM D638–52T.

From the foregoing, it is seen that treatment of a catalyst comprising an organometal halide and a group IV metal alcoholate as described herein provides a polymerization catalyst which gives increased yields of polymer in the polymerization of olefinic hydrocarbons. Various modifications and variations of the invention will be apparent to those skilled in the art from a consideration of the foregoing disclosure. Such modifications and variations are believed to be clearly within the spirit and scope of the invention.

We claim:

1. In a method for polymerizing ethylene in the presence of a catalyst comprising tetrabutyl titanate and an organometal compound selected from the group consisting of ethylaluminum dichloride, diethylaluminum chloride, and a mixture of ethylaluminum dichloride and diethylaluminum chloride, the improvement which comprises initially contacting said two components at a temperature in the range of 100 to 150° F. for a period of time in the range of 15 to 60 minutes, said contacting occurring under at atmosphere of a fluid which prevents catalyst deactivating materials from coming into contact with said catalyst components, thereafter contacting said components with said ethylene at a temperature in the range of 140 to 250° F. and a pressure in the range of 100 to 1000 p.s.i.g., said initial contacting temperature being at least 30° F. below that at which said components are contacted with ethylene and recovering the polymer so produced.

2. The method according to claim 1 wherein said initial contacting of said components and said contacting of said components with said ethylene occurs in the presence of a diluent which is inert and liquid under conditions of the method.

3. The method according to claim 1 wherein the ratio of the amount of said organometal compound to the amount of said tetrabutyl titanate is in the range of 2.5:1 to 7:1 on a weight basis.

4. The method according to claim 1 wherein the ratio of the amount of said organometal compound to the amount of said tetrabutyl titanate is in the range of 3:1 to 5:1 on a weight basis.

5. The method according to claim 1 wherein said organometal compound consists essentially of a mixture of ethylaluminum dichloride and diethylaluminum chloride.

6. The method according to claim 1 wherein said organometal compound consists essentially of ethylaluminum dichloride.

7. The method according to claim 1 wherein said organometal compound consists essentially of diethylaluminum chloride.

8. A method for polymerizing ethylene which comprises initially contacting a mixture of ethylaluminum dichloride and diethylaluminum chloride with tetrabutyl titanate in the presence of cyclohexane, said contacting occurring at a temperature in the range of 100 to 150° F. under an atmosphere of ethylene at a pressure below about 100 p.s.i.g. for a period of time in the range of 15 to 60 minutes; thereafter contacting the resulting catalyst with ethylene in the presence of cyclohexane at a temperature in the range of 140 to 250° F. and a pressure in the range of 250 to 1000 p.s.i.g., said initial contacting temperature being at least 30° F. below said ethylene contacting temperature.

9. A method for polymerizing ethylene which comprises initially contacting a mixture of ethylaluminum dichloride and diethylaluminum chloride with tetrabutyl titanate in the presence of cyclohexane, said contacting occurring at a temperature in the range of 100 to 150° F. under an atmosphere of nitrogen for a period of time in the range of 15 to 60 minutes; thereafter contacting the resulting catalyst with ethylene in the presence of cyclohexane at a temperature in the range of 140 to 250° F. and a pressure in the range of 250 to 1000 p.s.i.g., said initial contacting temperature being at least 30° F. below said ethylene contacting temperature.

References Cited in the file of this patent

UNITED STATES PATENTS

| | | |
|---|---|---|
| 2,822,357 | Brebner et al. | Feb. 4, 1958 |
| 2,833,755 | Coover | May 6, 1958 |
| 2,845,414 | Schutze | July 29, 1958 |
| 2,862,917 | Anderson et al. | Dec. 2, 1958 |
| 2,886,560 | Weber et al. | May 12, 1959 |
| 2,962,491 | Mertzweiller | Nov. 29, 1960 |

FOREIGN PATENTS

| | | |
|---|---|---|
| 533,362 | Belgium | May 16, 1955 |
| 534,888 | Belgium | Jan. 31, 1955 |
| 538,782 | Belgium | Dec. 6, 1955 |
| 546,846 | Belgium | Apr. 7, 1956 |

OTHER REFERENCES

Linear and Stereoregular Addition Polymers, by Gaylord and Mark, Interscience Pub. Inc., New York, 1959, pages 92, 109, 110 and 228, also pages 154, 155.